UNITED STATES PATENT OFFICE.

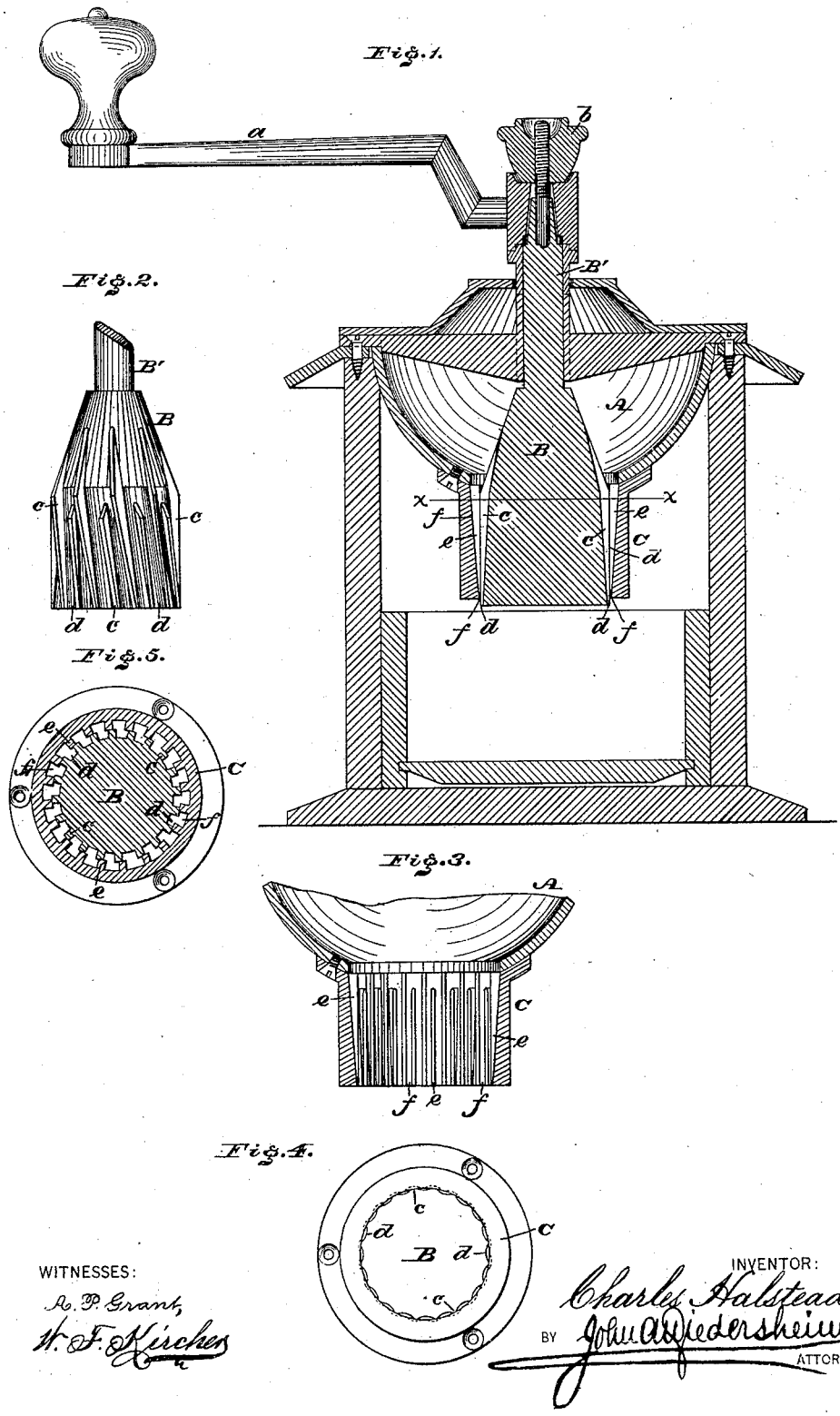

CHARLES HALSTEAD, OF NEW YORK, N. Y.

COFFEE AND SPICE MILL.

SPECIFICATION forming part of Letters Patent No. 310,418, dated January 6, 1885.

Application filed March 29, 1884. (No model.)

*To all whom it may concern:*

Be it known that I, CHARLES HALSTEAD, a citizen of the United States, residing in the city, county, and State of New York, have invented a new and useful Improvement in Coffee and Spice Mills, which improvement is fully set forth in the following specification and accompanying drawings, in which—

Figure 1 is a vertical section of a coffee-mill embodying my invention. Fig. 2 is a side elevation of the burr of the mill detached. Fig. 3 is a vertical section of the shell thereof. Fig. 4 is a bottom view of the burr and shell, and Fig. 5 is a horizontal section in line $xx$, Fig. 1.

Similar letters of reference indicate corresponding parts in the several figures.

This invention relates to coffee and spice mills which employ a conical toothed burr rotating within a conical internally-toothed shell.

The said invention consists in a burr provided with spiral teeth and grooves, in combination with a shell provided with vertical teeth and grooves, the grooves both in the burr and in the shell decreasing in depth toward the bottom, and the teeth in both having straight edges, substantially as hereinafter described.

The said invention further consists in a burr provided with spiral teeth, in combination with a surrounding shell provided with teeth arranged in vertical planes and having vertical edges, all points of which come in contact successively with said spiral teeth, substantially as hereinafter described.

Referring to the drawings, A represents the hopper, B the grinding-burr, and C the shell within which the burr rotates, said shell being attached to the hopper, and the latter supported on a suitable box or frame. The burr is fastened to a shaft, B', which is provided with a crank-handle, $a$, for operating purposes, and a nut, $b$, for raising and lowering the burr in the shell C. The shell C is of cylindrical form, the teeth $e$ thereof extending in vertical planes and having vertical edges, and the spaces or grooves $f$ between the teeth decrease in depth from top to near the bottom. The burr is of cylindrical form, fitting close to the shell C, the teeth $c$ thereof extending spirally from top to bottom thereof, and the spaces or grooves $d$ between the teeth decrease in depth from top to bottom, so that, owing to the diminished depth of the grooves at their termination, the outlets at the bottom may be made large or small by raising or lowering the burr in the shell C. The sides of the grooves $df$ are straight or flat in cross-section, (see Fig. 5,) thus providing sharp cutting-edges for the teeth of the shell and burr. It will be seen that as the coffee or spice leaves the hopper it is directed into the grooves $df$ and carried by the revolving burr against the teeth $e$ of the shell, the vertical edges of which touch at all points the edges of the oblique or spiral teeth $c$ as the latter are successively carried round. The points of contact shift along the edge of each tooth $e$, but remain necessarily in the same vertical plane. The right-lined perpendicular teeth of the shell hold the material, while the spiral teeth of the burr act thereagainst with a shearing or drawing cut, due to the spiral or inclined arrangement and the tapering shape of said teeth, and thus said material is cut in an expeditious and effectual manner without liability to escape the cutting operations. When the material has been reduced to the required fineness, it drops from the burr through the outlets at the bottom thereof, the degree of fineness being adjusted by the nut $b$, whereby the size of the bottom outlets may be enlarged or diminished.

Having thus described my invention, what I claim as new, and desire to secure by Letters Patent, is—

1. A burr provided with spiral teeth and grooves, in combination with a shell provided with vertical teeth and grooves, the grooves both in the burr and the shell decreasing in depth toward the bottom, and the teeth in both having straight edges, substantially as described.

2. A burr provided with spiral teeth, in combination with a surrounding shell provided with teeth arranged in vertical planes and having vertical edges, all points of which come in contact successively with said spiral teeth, substantially as set forth.

CHARLES HALSTEAD.

Witnesses:
JOHN A. WIEDERSHEIM,
JNO. K. PLITT.